Figure 1:
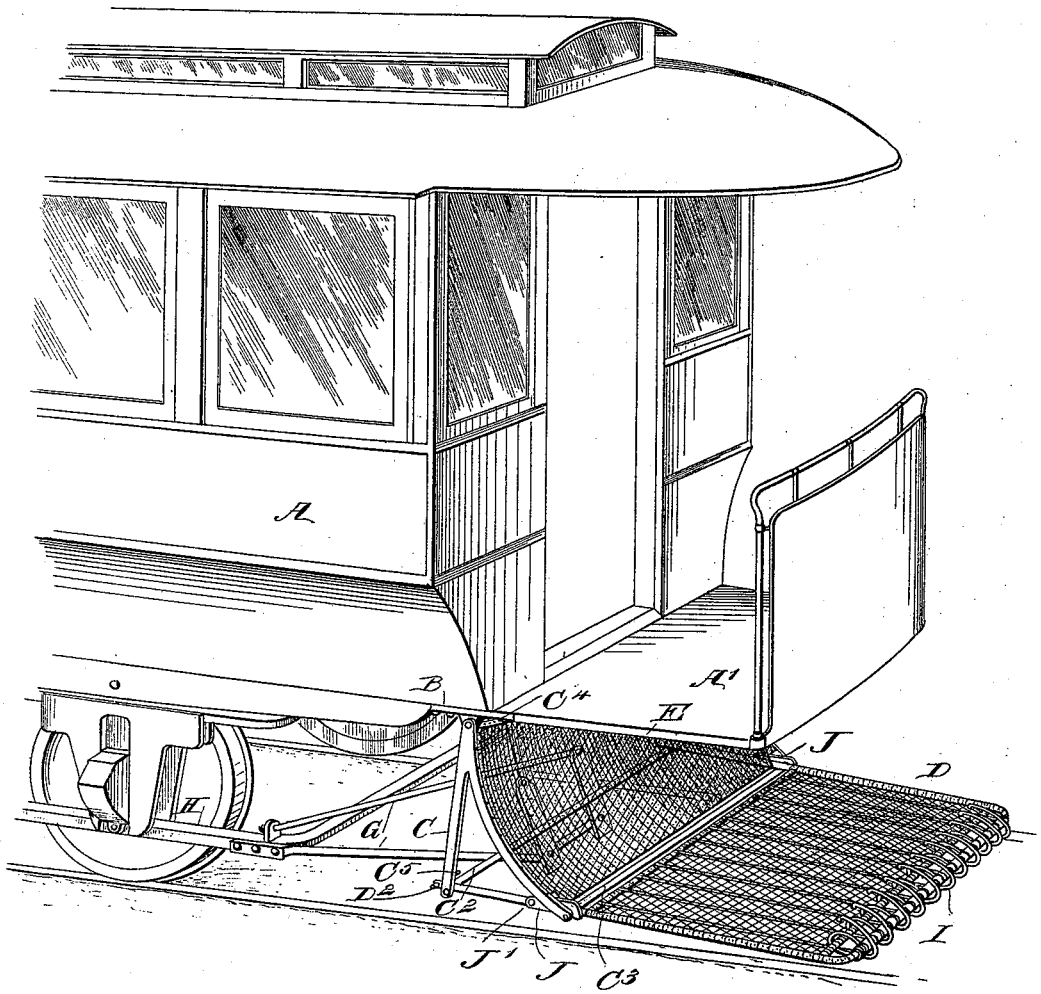

(No Model.) 2 Sheets—Sheet 1.

A. L. REYNOLDS & D. A. CENTER.
CAR FENDER.

No. 532,992. Patented Jan. 22, 1895.

WITNESSES:
H. Walker
C. Sedgwick

INVENTORS
A. L. Reynolds
BY D. A. Center
Munn & Co
ATTORNEYS.

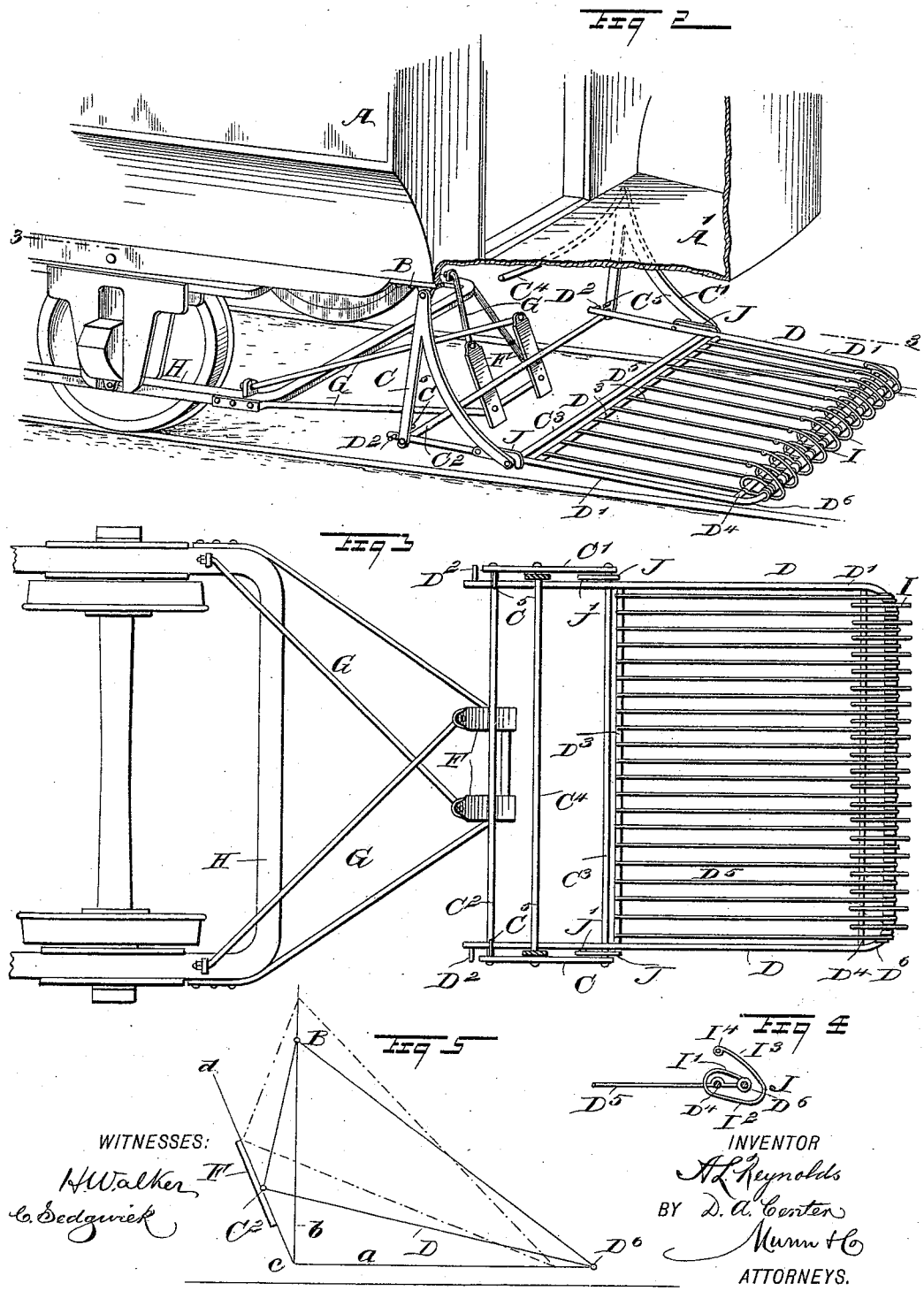

UNITED STATES PATENT OFFICE.

ADELBERT L. REYNOLDS AND DAVID A. CENTER, OF NEW YORK, N. Y.

CAR-FENDER.

SPECIFICATION forming part of Letters Patent No. 532,992, dated January 22, 1895.

Application filed March 3, 1894. Serial No. 502,226. (No model.)

*To all whom it may concern:*

Be it known that we, ADELBERT L. REYNOLDS and DAVID A. CENTER, of the city, county, and State of New York, have invented a new and Improved Car-Fender, of which the following is a full, clear, and exact description.

The object of the invention is to provide a new and improved car-fender, which is comparatively simple and durable in construction, arranged to maintain at all times the uniform distance above the track, and adapted to pick up persons in the path of the car without injury to the same.

The invention consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a perspective view of the improvement as applied. Fig. 2 is a similar view of the same with parts broken out and the netting removed. Fig. 3 is a sectional plan view of the same on the line 3—3 of Fig. 2. Fig. 4 is a sectional side elevation of the front end of the fender frame, showing one of the springs, and Fig. 5 is a diagram showing the geometrical relation between the fender frame guide and track surface.

On the under side of the car A and directly in the rear of the platform A' are secured the hangers B arranged near the sides of the car and carrying pivots for the fender frame, comprising principally the standards C, C', and the fender platform D. The standards C, C', are triangular in shape and pivoted at their upper ends to the hangers B. The lower ends of the standards C, C', are connected with each other by cross bars or rods $C^2$ and $C^3$, and the upper ends by a cross bar $C^4$ as plainly illustrated in the drawings. The bars $C^2$, $C^3$, support the slightly inclined fender platform D of the fender frame, the platform extending outward under the platform A' and a short distance above the track surface, so that persons in the path of the car are readily picked up by the said fender platform and not liable to be run over by the wheels of the car.

The platform D is provided with a main frame D' made approximately U-shaped, and having the rear ends of its side bars resting on the said bars $C^2$ and $C^3$ and in order to hold the platform in position, we provide the standards C, C' with inwardly-projecting pins $C^5$ extending over the sides of the frame D' of the fender platform D. The extreme rear ends of the sides of the main frame D' carry pins $D^2$ to limit the forward sliding movement of the platform frame. The side bars of the main frame D' are connected with each other by cross bars $D^3$ and $D^4$ supporting a series of longitudinally-extending rods $D^5$, also connected with the middle portion $D^6$ of the frame D'.

The front part of the fender platform D over the rods $D^5$, is preferably covered with a netting, and a similar netting E is attached to the standards C, C', so as to form a somewhat curved back for the platform, as plainly indicated in Fig. 1.

The cross bar $C^2$ connecting the fender standards C and C' with each other, engages a guide F rigidly supported by braces G from the truck frame H, so that the said guide F is not affected in its position on the up and down movement of the car A, which movement of the car, as is well known, is due to an increase or decrease of the load of the car. The guide F is inclined upwardly and rearwardly, as plainly shown in the drawings, special reference being had to the diagram shown in Fig. 5. The inclination of the guide F is such that the up and down movement of the car on which the fender standards C, C' are pivoted, causes the front end of the fender platform D supported on the standards C, C' to stand at all times, the same distance above the surface of the track, no matter how much the up and down movement of the car A.

It is understood that the above-described compensating device, consisting of the fixed guide F and fender frame may be arranged in such a manner that the inclined guide F forms part of the fender frame and travels on a rod or other projection supported rigidly from the car truck, the result in this case being the same as described above.

In order to obtain the inclination of the guide F, it is necessary to first locate the front end of the platform D, a suitable distance above the ground or track surface, as indicated in Fig. 5, the front end being represented by the middle portion $D^6$ of the main frame $D'$. A horizontal line $a$ is then drawn through this front end of the platform D, and a vertical line $b$ is drawn from the pivot of the standard C in the hanger B, to intersect the horizontal line $a$ at the point $c$. The distance from the bar $C^2$ to the pivots of the standards C, C′, is then determined and a right angle is drawn from the points B, $C^2$, $D^6$, and then the line $c$, $d$, is drawn from the intersection of the lines $a$ $b$ at the point $c$, through the rod $C^2$, as shown in Fig. 5. The line $c$ $d$ then gives the inclination of the guide F. Now, it will be seen that as the pivot of the standard C in the hanger B moves vertically up and down in the line $b$, the rod $C^2$ in traveling on the guide F will at all times cause the front end or rod $D^6$ of the platform D to stand at the same distance above the street surface, as the said rod will travel in the horizontal line $a$. Thus it will be seen, that a geometrical relation is obtained between the position and form of the guide F and the pivots of the standards C, C′, and the front end of the platform D, to compensate for the up and down movement of the car, without elevating or lowering the front end of the fender platform D over the track.

In order to ease the concussion of the person when struck by the front end of the platform D, we provide the front end with springs I, each fastened at one end to the middle rod $D^6$ of the frame $D'$, see Fig. 4, and then the spring is extended rearwardly and slightly upwardly as at I′, to be then curved downward at the rear of the cross bar $D^4$ to extend under the said cross bar $D^4$ and the rod $D^6$ as at $I^2$, to then curve upwardly, in front of the rod $D^6$, and to extend upwardly and rearwardly, as at $I^3$, to finally terminate in an eye or knob $I^4$ located a short distance above the horizontal rods $D^5$. It will be seen by this arrangement of springs, the person struck by the platform is not liable to be injured, and the springs in yielding are adapted to rest with their parts I′ and $I^3$ on the cross rod $D^4$, and middle rod $D^6$, to prevent the springs from breaking on being loaded from the top by a heavy person or other obstruction.

In order to prevent the platform D from sliding rearward accidentally, we provide the latches J pivoted at J′ to the sides of the frame $D'$, the said latches hooking over the cross bar $C^3$, as plainly shown in the drawings. Now, when it is desired not to use the platform D, then the operator unhooks the latches J and pushes the platform D rearwardly, to finally engage the cross rod $D^4$ with the said latches to lock the platform in place on the standards C, C′, it being understood that the platform is not in active position then for picking up persons or other obstructions on the track.

Having thus fully described our invention, we claim as new and desire to secure by Letters Patent—

1. A car fender hung upon the car body, in combination with inclined guides rigidly supported from the truck frame, the fender frame being arranged to travel upon the said guides, substantially as and for the purposes herein shown and described.

2. A car fender hung upon the car body and carrying a horizontally slidable platform, in combination with inclined guides rigidly supported from the truck frame, the fender frame being arranged to travel upon the said guides substantially as shown and described.

3. A car fender, provided with a fender frame, comprising pivoted standards swinging longitudinally in respect to the car body and a fender platform supported on the said standards and adapted to be shifted horizontally thereon, substantially as shown and described.

4. A car fender, provided with a fender frame, comprising standards pivoted on the under side of the car, bars connecting the standards with each other, and a platform adjustably supported on the said bars in an approximately horizontal position and adapted to be shifted longitudinally thereon, substantially as shown and described.

5. A car fender provided with a fender frame comprising triangular standards pivoted to the under side of the car, bars connecting the standards with each other, a fender platform supported from the said bars and projecting forwardly beyond the standards, and means for locking the said fender platform in place on the said standard bars, substantially as shown and described.

6. A car fender provided with a fender platform having springs at its front ends, each spring being fastened at one end to the fender platform and then extended rearward and upward, then curved downward and extended forwardly, and then curved upward and extended upwardly and rearwardly; substantially as shown and described.

7. A car fender provided with a fender platform having springs at its front ends, each spring being fastened at one end to the fender platform and then extended rearward and upward, then curved downward and extended forwardly, and then curved upward and extended upwardly and rearwardly, the end then terminating in a knob or eye, substantially as shown and described.

8. In a car fender, the combination with an inclined guide rigidly supported from the truck frame, of a fender frame pivoted on the under side of the car and provided with a cross bar traveling on the said inclined guide, substantially as shown and described.

9. In a car fender, the combination with an inclined guide rigidly supported from the truck frame, of a fender frame comprising triangular standards pivoted on the under side of the car, cross bars connecting the standards with each other, and one traveling on the said inclined guide, and a fender platform held adjustable on the cross bars of the standards, substantially as shown and described.

10. In a car fender, the combination with an inclined guide rigidly supported from the truck frame, of a fender frame comprising triangular standards pivoted on the under side of the car, cross bars connecting the standards with each other and one traveling on the said inclined guide, a fender platform held adjustable on the cross bars of the standards, and means, substantially as described, for locking the said fender platform on the said standard cross bars, substantially as shown and described.

11. A car fender, provided with a fender platform, comprising standards pivoted to the under side of the car and abutting on a part fixed to the truck frame to limit the rearward swinging motion of the standards, a wire netting stretched between the said standards, a fender platform supported in an approximately horizontal position on standard bars and having a slidable connection therewith, and a wire netting over the said platform, substantially as shown and described.

12. A car fender, provided with a fender platform, comprising standards pivoted to the under side of the car and abutting on a part fixed to the truck frame to limit the rearward swinging motion of the standards, a wire netting stretched between the said standards, a fender platform supported in an approximately horizontal position on standard bars and having a slidable connection therewith, a wire netting over the said platform, and means, substantially as described, for locking the said platform in a forward extended position to the said bars, substantially as described.

13. A car fender provided at its front end with springs, each having the end of its longitudinally extending top part free to permit the spring to readily yield on striking an obstruction, substantially as shown and described.

14. A car fender carrying at its front end a series of springs, each provided with a curved or rounded front portion terminating in a longitudinally extending top part having a free rear end to permit the spring to readily yield on striking an obstruction, and to lift the latter, substantially as shown and described.

ADELBERT L. REYNOLDS.
DAVID A. CENTER.

Witnesses:
C. SEDGWICK,
F. W. HANAFORD.